Patented Feb. 24, 1931

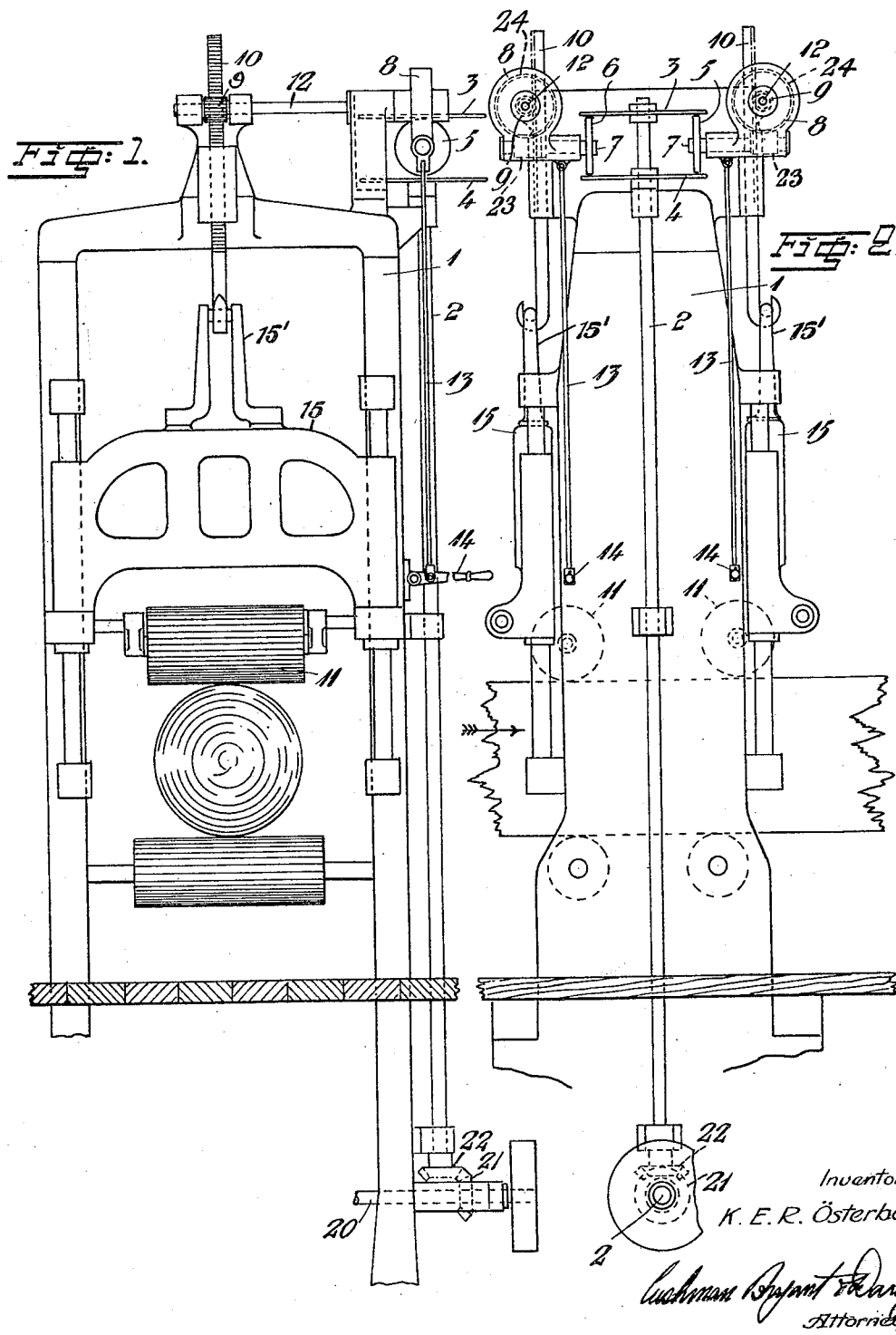

1,794,351

UNITED STATES PATENT OFFICE

KARL ERIK RUDOLF ÖSTERBERG, OF STOCKHOLM, SWEDEN, ASSIGNOR TO J. & C. G. BOLINDERS MEKANISKA VERKSTADS AKTIEBOLAG, OF STOCKHOLM, SWEDEN, A JOINT-STOCK COMPANY

SAWING-MACHINE FRAME

Application filed June 3, 1930, Serial No. 459,098, and in Sweden November 9, 1929.

When logs of varying sizes are sawn up in a saw frame, or when they, as is frequently the case, are introduced into the saw frame with the root end first, the front feed roller as well as the rear feed roller of the saw frame must be raised for each log introduced. This work, which has hitherto been effected manually, and which must be repeated perhaps hundreds of times daily, is rendered very fatiguing on account of the very considerable weight of the upper rollers.

The present invention, which has for its object to obviate the said drawback, provides for an arrangement by means of which the lifting of the rollers may be effected with the aid of mechanical power so that both pressure rollers may be raised and lowered independently of each other.

The arrangement aimed at by the invention is principally characterized by the feature that the pressure rollers of the saw frame, which are adapted to be raised and lowered, are connected each per se with a power transmitting means provided at the saw frame, the connection being effected by means of gearings which are reversible in such a manner that, when the one or the other of said gearings, or both of them at the same time, is/are thrown into engagement, the one or the other pressure roller, or both of them at the same time, will be raised or lowered.

The invention is preferably carried into effect with the use of so-called disk gearings in which two plane friction disks are secured on a power transmitting shaft mounted in the frame of the saw frame, whereas between said disks are arranged two other friction disks which may, each per se, be brought into cooperation with the one or the other of the first-mentioned friction disks, and which are in driving connection, through worm gearings or other suitable gearings, with toothed racks or the like adapted to be raised and lowered, said racks carrying the pressure rollers.

The accompanying drawing illustrates by way of example a saw frame arranged in accordance with the new construction. Fig. 1 shows the frame in a front view and Fig. 2 the same in a side elevation.

Mounted on one side of the main frame 1 of the machine is a vertical countershaft 2 which is driven continuously during the operation of the machine by a power shaft 20 through bevel gears 21, 22. Countershaft 2 has fixed thereto at its upper end two plane friction disks 3 and 4, in spaced relation, on diametrically opposite sides of which, and between the two disks, are arranged friction disks 5 and 6 on worm shafts 7 having worm portions 23 which engage worm wheels 24. Worm wheels 24 are fixed on shafts 12 and surrounding the wheels and oscillable about the shafts 12 are housings 8 in which the worm shafts 7 are journaled.

Shafts 12 have fixed thereto pinions 9 engaging the teeth of vertical rack bars 10 whose lower hooked ends engage bails 15' secured to vertical slides 15 which support the pressure rollers 11.

A rod 13 is pivotally connected at its upper end to each of the casings 8 adjacent the wheels 5 and 6 respectively, each rod being pivoted at its lower end to an actuating lever 14 within easy reach of the machine operator. By manipulation of levers 14, disks 5 and 6 may be engaged simultaneously or separately with either of disks 3 and 4 to impart drive to the worm shafts 7 in the desired direction, whereby pinions 9 are driven to actuate the rack bars and thus appropriately displace frames 15 and pressure rollers 11. It will be understood that engagement of the driven disks 5 and 6 with the drive disks 3 and 4 is possible due to the oscillability of casings 8 about shafts 12.

When either one of the pressure rollers 11 is to be raised or lowered its corresponding lever 14 is actuated, the friction disk 5 or 6 being thus brought into cooperation with the friction disk 3 or 4. The movement from the latter is then transmitted to the toothed rack 10 through the thrown-in friction disk 5 or 6 and through its corresponding worm gearing and the pinion 9, the toothed rack 10 being thus raised or lowered so as to raise or lower the corresponding roller frame 15 and its corresponding pressure roller 11.

Obviously, both pressure rollers 11 may be raised or lowered simultaneously by actuating the two levers 14 at the same time.

What I claim is:—

1. In a machine of the class described, an upright main frame, a horizontal pressure roller, a supporting frame for said roller adjustable vertically on the main frame, a power shaft on the main frame, a vertical countershaft driven by the power shaft, spaced friction drive disks on said countershaft adjacent the top of the main frame, a friction driven disk selectively cooperable with said drive disks for rotation thereby in either direction, a worm shaft driven by said driven disk, a worm wheel engaging said worm shaft, a shaft on which said worm wheel is fixed, a pinion fixed on said worm wheel shaft, and a vertically extending rack bar having its upper portion engaged with said pinion and its lower end in connection with said bearing frame.

2. Structure according to claim 1 wherein the worm wheel is provided with a housing in which the worm shaft is journaled, the driven disk being fixed on the worm shaft and the housing being oscillable about the worm wheel shaft to engage the driven disk with either of the drive disks.

3. In a machine of the class described, an upright main frame, a horizontal pressure roller, a supporting frame for said pressure roller adjustable vertically on the main frame, a vertical driven shaft on the main frame, spaced friction drive disks on said countershaft adjacent the top of the main frame, a friction driven disk selectively cooperable with said drive disks for rotation thereby in either direction, a worm shaft driven by said driven disk, a worm wheel engaging said worm shaft, a shaft on which said worm wheel is fixed, a worm housing oscillable about said worm wheel shaft and having bearings supporting said worm shaft, means for oscillating the housing to engage the driven disk with the drive disks, and means driven by the worm wheel shaft for adjusting said supporting frame.

KARL ERIK RUDOLF ÖSTERBERG.